United States Patent
Kikuchi et al.

[11] 3,885,313
[45] May 27, 1975

[54] ARTIFICIAL TOOTH SUPPORTER FOR HEAT TREATMENT

[75] Inventors: Zenichi Kikuchi; Keijyo Yamada; Tatuo Kimura, all of Tokyo, Japan

[73] Assignee: Fujishiken Ltd., Tokyo, Japan

[22] Filed: July 18, 1973

[21] Appl. No.: 380,235

[30] Foreign Application Priority Data
July 20, 1972  Japan............................ 47-72050
Dec. 7, 1972  Japan............................ 47-139949

[52] U.S. Cl............................. 32/40 R; 269/296
[51] Int. Cl............................. A61c 3/00
[58] Field of Search............ 32/1, 8, 40 R, 68, 71; 269/50, 51, 52, 53, 296, 309, 311

[56] References Cited
UNITED STATES PATENTS
| | | | |
|---|---|---|---|
| 785,992 | 3/1905 | Whiteley | 32/71 |
| 2,805,478 | 9/1957 | Adams | 32/71 |
| 3,175,820 | 3/1965 | Schiler | 269/309 |
| 3,537,697 | 11/1970 | Davis | 269/50 |
| 3,606,300 | 9/1971 | Davis | 269/296 |

Primary Examiner—Louis G. Mancene
Assistant Examiner—J. Q. Lever
Attorney, Agent, or Firm—Cushman, Darby & Cushman

[57] ABSTRACT

An artificial tooth supporter for heat treatment has at least one artificial tooth supporting pin detachably engaged with a base plate and displaceable relative to the base plate.

11 Claims, 11 Drawing Figures

3,885,313
FIG. 1
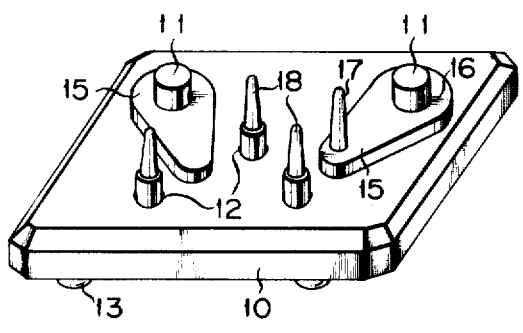
FIG. 2
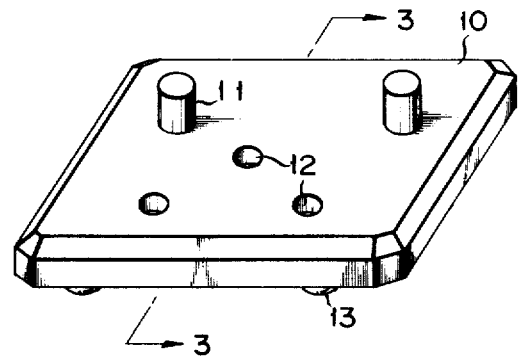
FIG. 3
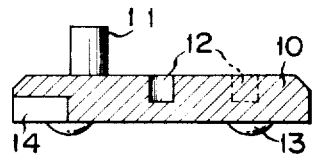
FIG. 4
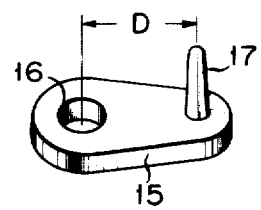
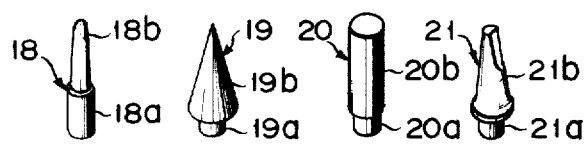
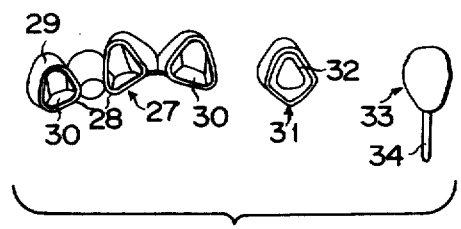
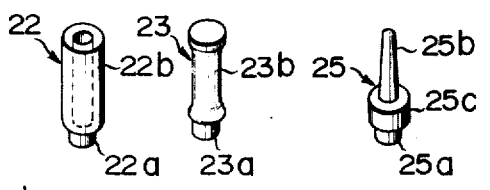
FIG. 5
FIG. 6

3,885,313

ARTIFICIAL TOOTH SUPPORTER FOR HEAT TREATMENT

BACKGROUND OF THE INVENTION

This invention relates to an artificial tooth supporting for use in heat treating artificial teeth or dental bridges.

Recently use has been mainly made of an artificial porcelain or synthetic resin tooth or dental bridge. The teeth of this type is manufactured by applying a porcelain or synthetic resin material to a dental lining member such as a gold alloy etc. to form an outer shape, and then heat treating it, at a high temperature, in a small-sized furnace to effect sintering or thermal hardening. During the manufacturing operation, the artificial tooth or teeth are supported, on supporting pins fixed at a given interval to a base plate. In the case of a dental bridge, however, it can not be suitably held in place, since the end-to-end interval of the dental bridge is varied dependent upon the user. Furthermore, in an attempt to search a pair of tooth supporting pins suitably matching with the dental bridge of the user, a time is consumed with the attendant disadvantage. During the manufacturing operation the artificial teeth or dental bridge wavers on the supporting pin, or is dropped down from the supporting pin, since the shape of the supporting pin is not suitably matched.

SUMMARY OF THE INVENTION

An object of this invention is to provide an artificial tooth supporter capable of easily and suitably supporting a tooth or dental bridge during a heat treatment.

BRIEF DESCRIPTION OF THE DRAWINGS

FIG. 1 is a perspective view showing an artificial tooth supporter according to one embodiment of this invention;

FIG. 2 shows a base plate of the supporter of FIG. 1;

FIG. 3 is a cross sectional view taken along line 3 — 3 of FIG. 2;

FIG. 4 is a perspective view showing a movable member of the supporter which is used in the practice of this invention;

FIG. 5 shows a variety of detachably mountable artificial tooth supporting pins;

FIG. 6 is a view taken from the bottom of artificial teeth;

DETAILED DESCRIPTION OF THE INVENTION

Figure 7A:
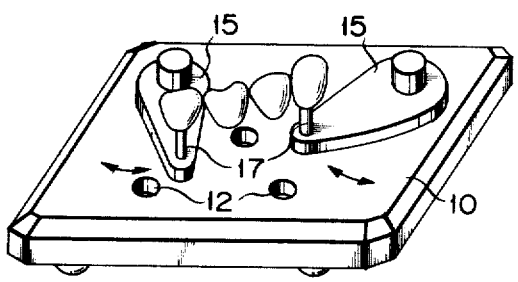
FIGS. 7A – 7C are views each showing the artificial teeth supported on the supporter of FIG. 1.

Referring to FIG. 1, a false or artificial tooth supporter according to this invention has substantially a rectangular base plate 10. The base plate has at its upper surface a pair of upright projecting columns 11 integral therewith and a plurality of circular recesses 12 less in diameter than the upright column (see FIGS. 2 and 3). The base plate has at its under surface a plurality of feet 13 for supporting the base plate and a cutout 14 capable of being engaged with a pair of pincettes etc. in an attempt to insert the tooth supporter in a furnace. The cutout is located away from the recess 12 to prevent any crack or breakage of the base plate.

Substantially an oval-shaped movable member 15 is rotatably and detachably mounted to the supporter by fitting the upright column over a hole 16 of the member 15 (see FIGS. 1 and 4). An upright artificial tooth supporting pin 17 is displaced a distance D from the center axis of the hole 16 and formed integral with the member 15. When the movable member 15 is swung about the upright column, then the supporting pin 17 is displaced on the base plate.

A supporting pin 18 consists of an inserting portion 18a the same in diameter with the circular recess and a supporting section 18b for supporting an artificial tooth, and is detachably fitted into the recess. The supporting section 18b is concentrical with the inserting section 18a and has a bottom somewhat smaller in diameter than the inserting section 18a. The supporting section is gradually decreased in diameter towards its top.

In FIG. 1 only the supporting pin 18 is shown by way of example, but a variety of supporting pins as shown in FIG. 5 can be used in the practice of this invention. A supporting pin 19 has a conical-shaped artificial tooth supporting section 19b whose bottom portion is larger in diameter than an inserting section 19a. A supporting pin 20 has a cylindrical supporting section 29b larger in diameter than an inserting section 20a and is suitable to support molar teeth. A supporting pin 21 has a wedge-like supporting section 21b to prevent an unstable wavering of teeth. A supporting pin 22 has a cylindrical supporting section 22b in which a longitudinal bore is provided to support a post of a post crown. A supporting pin 23 has a supporting section 23b similar in cross section to a concavo-concave lens. The shape of the supporting section 23b prevents a material for an artificial tooth from being run down and fixed to the supporting pin during the furnace heating. A supporting pin 25 has a cylindrical, large-diametered section 25c substantially the same as the hole 16 of the moving member 25c and acts as a supporting axis of the moving member.

Turning to FIG. 6, a variety of artificial teeth is shown. A dental bridge 27 consists of a metal lining material 28 and a porcelain material 29 for covering the metal lining. In the lining material is provided a recess 30 which matches with the tooth of the user. Where the dental bridge is used, the recess situated at each end of the dental bridge is engaged with the supporting pin. A dental crown 31 consists of one tooth having a recess 32 and a post crown 33 has a post 34 in place of a recess.

Figure 7B:
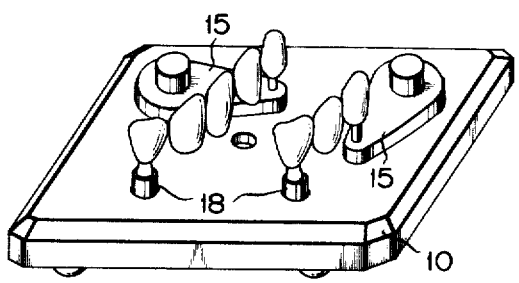
Figure 7C:
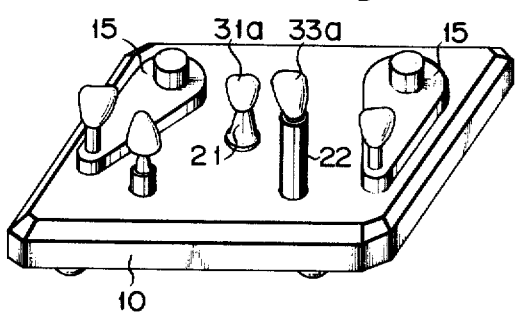

FIGS. 7A – 7C show the state in which a variety of artificial teeth is supported by the supporting pins as shown in FIGS. 1 – 5. The supporting pins as shown in FIGS. 4 and 5 can be suitably selected from the kind, shape, etc., of the artificial teeth. In FIG. 7A, one dental bridge is supported between the two movable members 15. The positions of the two movable members are adjusted, in a direction shown by arrows, according to the spacial distance between recess situated one at one end and one at the other end of a dental bridge. FIG. 7B shows two bridges supported by a pair of movable members and fixed supporting pins 18. FIG. 7C shows a plurality of artificial teeth supported on the base plate in which a supporting pin 21 supports a crown 31a and a supporting pin 22 supports a post crown 33a.

The artificial teeth supported on the supporting pins are subject to a heat treatment at a furnace (not shown), withdrawn from the furnace for correction, and again entered into the furnace for heat treatment.

Such operations are repeated several times and complete artificial teeth are obtained.

Figure 8:
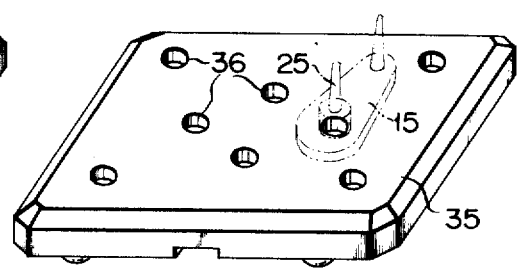
FIGS. 8 and 9 are other embodiments used in the practice of this invention.

The embodiment of FIG. 8 has a base plate with a plurality of recesses 36. Where the movable member 15 of FIG. 4 is fitted into the base plate, the supporting pin 25 of FIG. 5 is mounted to the base plate (as shown in dot-dash lines).

Figure 9:
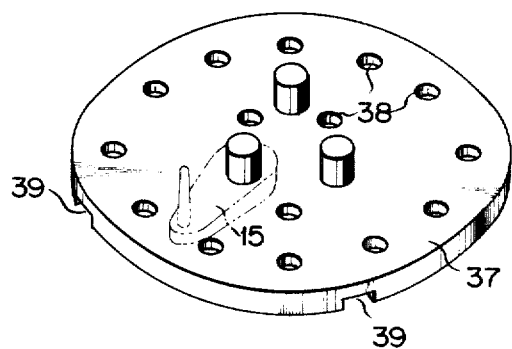

Referring to FIG. 9 there is shown a circular base plate 37 having holes more than those of the earlier embodiments. The base plate has a plurality of cutouts 39.

The shape of the base plate can be varied according to the type of furnaces used. The number of the supporting pins and recesses, as well as the location of the supporting pins and recesses, can be selected as required. With the above embodiments the hole for a rotary movement is provided in the movable member. Instead, a projecting column may be provided on the movable member so that it is engaged with a corresponding recess provided in the base plate.

The artificial tooth supporter according to this invention is used at a high temperature (in a case of porcelain teeth, more than 1,000°C and in case of synthetic resin teeth about 100°C), and formed by press-forming a heat resistant inorganic material including, as primary components, alumina and alundum, followed by sintering. The artificial tooth supporter of this kind can withstand a high temperature. In addition, a proper friction also occurs between the base plate and the movable member so that any unauthorized movement of the movable member can be prevented.

What we claim is:

1. An artificial tooth supporter for supporting artificial teeth when they are subjected to heat treating comprising a base plate formed with at least one recess in its upper surface, at lease one cylindrical column vertically upwardly projecting from the upper surface of the base plate, at least one movable member formed with a circular hole to be complementarily and detachably engaged with the column so that the movable member can be rotated about the column on the upper surface of the base plate, and first and second artificial tooth supporting pins for supporting the artificial teeth on their upper ends, said first supporting pin being upwardly projecting from the movable member and spaced from the circular hole, and said second supporting pin having at its lower end a fitting portion to be frictionally and detachably inserted into the recess of the base plate.

2. An artificial tooth supporter according to claim 1, which is made of a heat resistant inorganic material.

3. An artificial tooth supporter according to claim 2, which consists essentially of alumina and alundum.

4. An artificial tooth supporter according to claim 1, wherein said cylindrical column has at its upper end an artificial tooth supporting section.

5. An artificial tooth supporter according to claim 1, wherein said column is integrally formed with the base plate.

6. An artificial tooth supporter according to claim 1 in which said second supporting pin has a conical artificial tooth supporting section.

7. An artificial tooth supporter according to claim 1 in which said second supporting pin has a wedge-like artificial tooth supporting section.

8. An artificial tooth supporter according to claim 1 in which said second supporting pin has a cylindrical artificial tooth supporting section.

9. An artificial tooth supporter according to claim 1 in which said second supporting pin has a concentrically longitudinal bore.

10. An artificial tooth supporter according to claim 1 in which said base plate has at least one cutout on the other side surface of the base plate.

11. An artificial tooth supporter for supporting dental bridges when they are subjected to heat treating comprising a base plate, at least one cylindrical column vertically projecting from the upper surface of the base plate, at least one movable member formed with a circular hole complementary with the column and a first artificial tooth supporting pin upwardly projecting from the movable member and spaced from the circular hole, said movable member being adapted to be detachably engaged with the column through the hole and rest on the upper surface of the base plate, and at least one second artificial tooth supporting pin upwardly projecting from the base plate, whereby the dental bridge is supported on the first and second supporting pins so that the movable member is held at position by the dental bridge itself.

* * * * *